United States Patent [19]

Kuwabara

[11] Patent Number: 4,472,104
[45] Date of Patent: Sep. 18, 1984

[54] OPERATION CONTROL METHOD FOR MULTISTAGE REGULATED HYDRAULIC MACHINE

[75] Inventor: Takao Kuwabara, Hitachi, Japan
[73] Assignee: Hitachi, Ltd., Tokyo, Japan
[21] Appl. No.: 463,984
[22] Filed: Feb. 4, 1983

[30] Foreign Application Priority Data

Feb. 17, 1982 [JP] Japan .................................. 57-22625

[51] Int. Cl.³ ............................................ F03B 15/04
[52] U.S. Cl. ......................................... 415/1; 415/14; 415/500
[58] Field of Search ....................... 415/1, 500, 50, 14, 415/60, 13; 290/52

[56] References Cited

U.S. PATENT DOCUMENTS

| | | | |
|---|---|---|---|
| 3,275,293 | 9/1966 | Hosogai et al. | 415/500 |
| 4,073,594 | 2/1978 | Takagi | 415/1 |
| 4,346,304 | 8/1982 | Tsunoda et al. | 415/500 |

FOREIGN PATENT DOCUMENTS

| | | | |
|---|---|---|---|
| 2904410 | 8/1979 | Fed. Rep. of Germany | 415/1 |
| 52-14144 | 2/1977 | Japan | 415/500 |
| 54-8237 | 1/1979 | Japan | 415/1 |
| 54-108142 | 8/1979 | Japan | 415/500 |
| 109289 | 4/1981 | Japan | 415/500 |
| 688680 | 10/1979 | U.S.S.R. | 415/500 |

Primary Examiner—Stephen Marcus
Assistant Examiner—Brian J. Bowman
Attorney, Agent, or Firm—Thomas E. Beall, Jr.

[57] ABSTRACT

An operation control method for a multistage regulated hydraulic machine wherein channels of the stages from the lower pressure side to the higher pressure side are successively communicated with each other through return guides and at least two said stages are provided with respective guide vanes capable of having their degrees of opening controlled in synchronism with each other. The method includes the steps of: sensing that guide vanes of one of the stages becomes uncontrollable when the operation of opening and closing the guide vanes capable of having their degrees of opening controlled is performed while the degrees of opening of the guide vanes capable of having the degrees of opening thereof are controlled, and effecting control of the degrees of opening of the guide vanes of the other stages based on a signal issued in accordance with the result of sensing so as to keep the degree of opening of the guide vanes that have become uncontrollable and the degrees of opening of the guide vanes of the other stages in a predetermined relation of allowable opening degrees.

15 Claims, 11 Drawing Figures

FIG. I
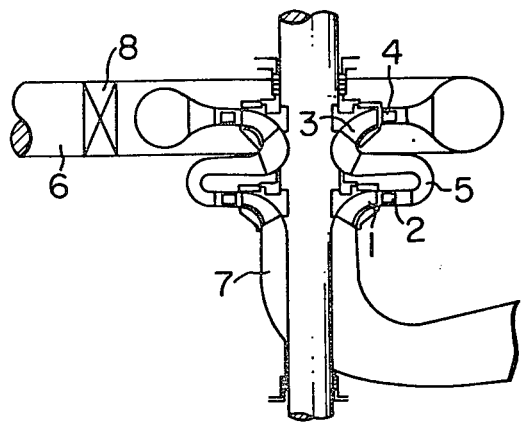
FIG. II
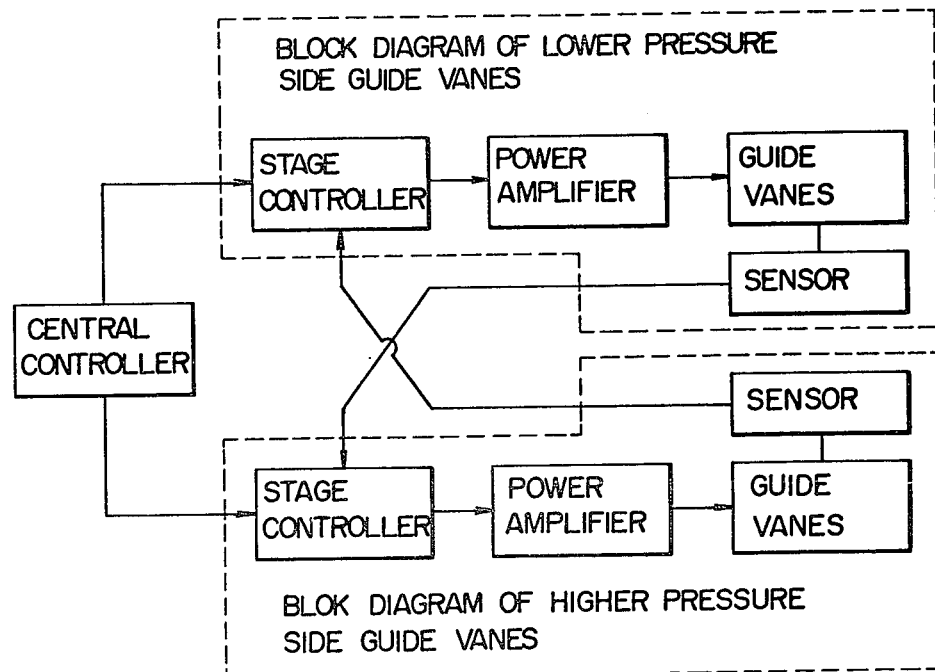

4,472,104

OPERATION CONTROL METHOD FOR MULTISTAGE REGULATED HYDRAULIC MACHINE

FIELD OF THE INVENTION

This invention relates to operation control methods for multistage regulated hydraulic machines, and more particularly it is concerned with an operation control method for a multistage regulated hydraulic machine capable of effecting control of the degree of opening wherein channels of the stages from the lower pressure side to the higher pressure side are successively communicated with each other through return guides and control of the degree of opening can be simultaneously effected for at least the two stages referred to hereinabove.

BRIEF DESCRIPTION OF THE DRAWINGS

FIG. 1 is a sectional view of the essential portions of a two-stage regulated hydraulic machine to which an embodiment of the method according to the invention can be applied;

FIG. 11 is a block diagram of one embodiment of the operation control method in conformity with the invention.

DESCRIPTION OF THE PRIOR ART

Figure 2:
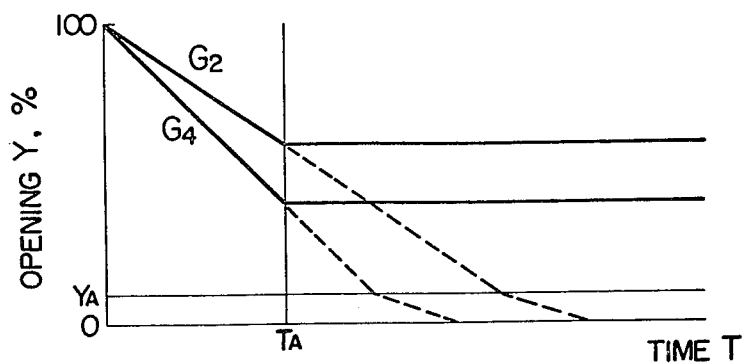
FIGS. 2-10 are views in explanation of the method according to the invention of operation control made by referring to various embodiments of the operation control method in conformity with the invention as applied to the hydraulic machine shown in FIG. 1.

FIG. 1 shows the essential portions of an ordinary two-stage regulated hydraulic machine comprising a higher pressure stage and a lower pressure stage suitable for use as a turbine or a reversible pump-turbine. A lower pressure stage comprising a runner 1 and guide vanes 2 and a higher pressure stage comprising a runner 3 and guide vanes 4 are communicated with each other through return guides 5. The higher pressure stage is connected to a penstock 6 and the lower pressure stage is connected to a draft tube 7. The numeral 8 designates an inlet valve mounted in the penstock 6 and located upstream of the guide vanes 4 of the higher pressure stage.

When the multistage regulated hydraulic machine of the aforesaid construction is in a turbine operation mode, the degree of opening of the guide vanes 2 of the lower pressure stage may, for some reason, unfortunately become lower than the degree of opening of the guide vanes 4 of the higher pressure stage and the operation of controlling the flow rate of fluid may be essentially performed by the guide vanes 2 of the lower pressure stage. When this is the case, fluid hammer which ordinarily acts only on the guide vanes 4 of the higher pressure stage and the penstock 6 and inlet valve 8 located upstream thereof will also act on each runner chamber and the return guides 5. In extreme cases, if only the guide vanes 2 of the lower pressure stage are closed while the guide vanes 4 of the higher pressure stage are in full open condition, all the pressure applied by the fluid hammer will act on the guide vanes 2 of the lower pressure stage and the interior of the machinery located upstream thereof, thereby causing excessive stresses to the same and destroying the same in an extreme case.

To cope with this situation, the guide vanes, runner chamber and return passage of the lower pressure stage may be designed to have sufficiently high strength to withstand the high pressure applied by the fluid hammer. However, this would involve a marked increase in the production cost of a hydraulic machine and would not provide a satisfactory practical solution. Thus it has been proposed to use operation control methods which prevent the higher and lower pressure stages from having their degrees of opening reversed. One of such proposals is disclosed in Japanese patent application laid-open No. 108143/79 which describes an operation control method preventing the guide vanes of the lower pressure stage from being brought to full closed position at all times. However, to introduce a modification beforehand to the usual method of operation control to cope with a possible reversal of the degrees of opening of the guide vanes of the higher and lower pressure stages would adversely affect the normal operation of the hydraulic machine. For example, the proposed method would suffer disadvantages when the liquid levels of the runner chambers are forced to move downwardly at pump mode start-up or at the time of syncronous condenser operation is carried out, so that the proposed method can have no application to operations for individually moving the liquid levels of the runner chambers because of the guide vanes of the lower pressure stage being prevented from coming to full closed position. Also, when foreign matter is drawn and jammed by suction while the guide vanes are being closed in the higher pressure stage or when trouble occurs in a pressure distribution valve for controlling the guide vanes, it would be impossible to provide a hydraulic machine with a satisfactory protection by the aforesaid method.

SUMMARY OF THE INVENTION

This invention has been developed for the purpose of obviating the aforesaid disadvantages of the prior art. Accordingly the invention has as its object the provision of a method of controlling guide vanes of a multistage regulated hydraulic machine, capable of providing the hydraulic machine with a satisfactory protection when the relation between the higher and lower pressure stages with regard to the degrees of opening of their guide vanes deviates from the normal condition without causing any trouble in normal operation of the hydraulic machine.

According to the invention, there is provided, for a multistage regulated hydraulic machine wherein channels of the stages from the lower pressure side to the higher pressure side are successively communicated with each other through return guides and at least two said stages are provided with respective guide vanes capable of having their degrees of opening controlled in synchronism with each other, a method of operation control comprising the steps of:

(a) sensing that the guide vanes of one of the stages becomes uncontrollable when the operation of opening and closing the guide vanes capable of having their degrees of opening controlled is performed while the degrees of opening of the guide vanes capable of having the degrees of opening thereof controlled are maintained in a predetermined opening degree relation; (b) effecting control of the degrees of opening of the guide vanes of the other stages based on a signal in accordance with the result of sensing so as to keep the degree of opening of the guide vanes that have become uncontrollable and the degrees of opening of the guide vanes of the other stages in a predetermined relation of allowable opening degrees.

DETAILED DESCRIPTION OF THE PREFERRED EMBODIMENTS

Preferred embodiments of the method of operation control in conformity with the invention will now be described by referring to the accompanying drawings.

In FIGS. 2–10, the abscissa represents the time T and the ordinate indicates the degrees of the guide vanes and the inlet valve in percents in each graph. In all the figures, $G_2$, $G_4$ and I represent the opening curve of the guide vanes 2 of the lower pressure stage, the opening curve of the guide vanes 4 of the higher pressure stage and the opening curve of the inlet valve 8, respectively. $Y_A$ indicates the upper limit degree of opening of the low speed closing operation speed range set for avoiding excessive shock stresses to the guide vane servomotor cylinder closing end stop due to sudden hitting of the servomotor piston which might otherwise be possible, $Y_A$ being usually in the range between 5 and 10%.

Referring to FIG. 2, when the guide vanes 2 of the lower pressure stage and the guide vanes 4 of the higher pressure stage are brought from full open position to closed position, the guide vanes 2 and 4 are closed by maintaining a predetermined opening degree relation in normal condition as indicated by the curves $G_2$ and $G_4$ and brought to full closed position as the curves trace broken line sections. The predetermined opening degree relation refers to an opening degree relation set beforehand in such a manner that the degree of opening of the guide vanes 2 of the lower pressure stage is equal to or greater than the degree of opening of the guide vanes 4 of the higher pressure stage. In FIG. 2, the degree of opening of the guide vanes 2 of the lower pressure stage is shown as being controlled in a manner to remain greater than that of the guide vanes 4 of the higher pressure stage at all times during the closing operation. Assume that the closing operation of the guide vanes 4 of the higher pressure stage is interrupted at time $T_A$. Then the condition will be sensed by sensing means which will produce a signal transmitted to a controller of the guide vanes 2 of the lower pressure stage, to thereby interrupt the closing operation thereof. As a result, the guide vanes 2 and 4 can be maintained in a predetermined opening degree relation without having the relation changed.

As described hereinabove, in the embodiment of the method in conformity with the invention, if the guide vanes 4 of the higher pressure stage are blocked due to some trouble during the closing operation of the guide vanes 2 and 4, then control is effected in such a manner that the closing operation of the guide vanes 2 of the lower pressure stage is simultaneously stopped based on sensing the blocking of the guide vanes 4 of the higher pressure stage by the sensing means. Thus it is possible to prevent excessively high hydraulic pressure from acting on the guide vanes 2 and return guide 5 of the lower pressure stage which might otherwise be applied by fluid hammer.

Figure 3:
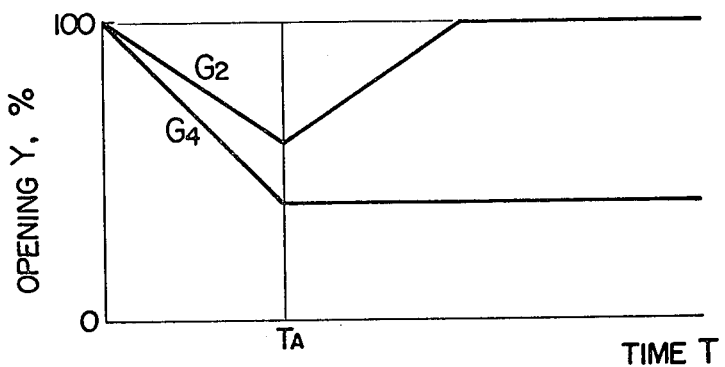

In the invention, it is possible to take measures to open the guide vanes 2 of the lower pressure stage as shown in FIG. 3 in place of stopping the closing opeation of the guide vanes 2 as shown in FIG. 2. This enables the degree of opening of the guide vanes 2 of the lower pressure stage to become much higher than that of the guide vanes 4 of the higher pressure stage, thereby transferring the opening degree relation between the guide vanes 2 and 4 to a much safer side.

Figure 4:
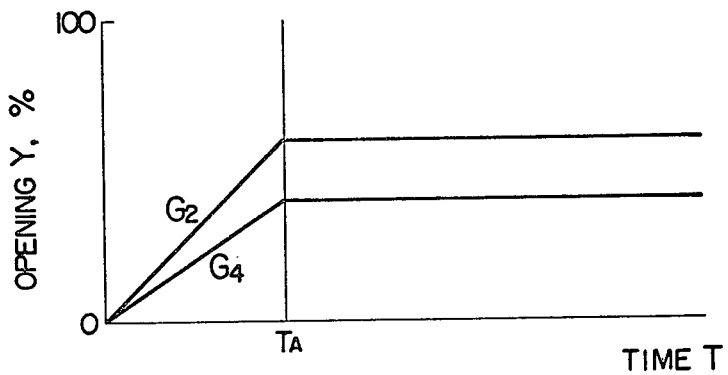
Figure 5:
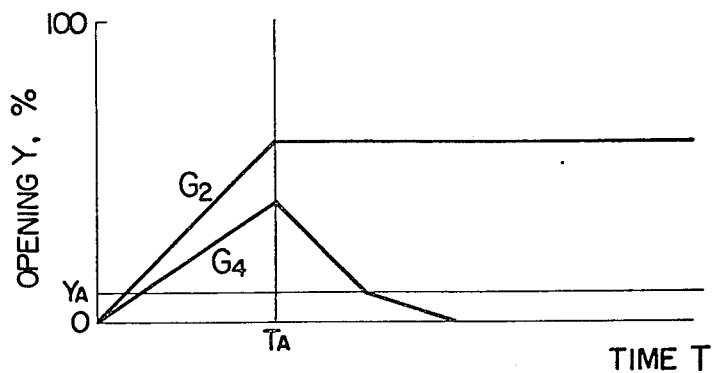

FIGS. 4 and 5 show embodiments of a method of controlling the guide vanes 4 of the higher pressure stage when the opening operation of the guide vanes 2 of the lower pressure stage is interrupted and the guide vanes 2 are blocked during the operation of shifting the guide vanes 2 and 4 from the full closed positions to open positions. If the guide vanes 2 of the lower pressure stage are blocked, then this condition is sensed by sensing means which produces a signal transmitted to a controller of the guide vanes 4 of the higher pressure stage. As a result, the opening operation of the guide vanes 4 of the higher pressure stage is interrupted (see FIG. 4) or the guide vanes 4 of the higher pressure stage are closed (see FIG. 5).

Means for sensing any one of the guide vanes becoming uncontrollable due to some trouble, when the aforesaid embodiments of the method according to the invention are carried into practice, may be of any known form as desired. For example, a circuit may be provided for sensing directly that any guide vanes might become uncontrollable by monitoring all the adjustable guide vanes 2 and 4 at all times by remote control and producing a signal when some guide vanes have come uncontrollable so as to thereby enable the degree of opening of the other guide vanes to be controlled. If is possible, of course, to indirectly sense the condition in which any guide vanes might become uncontrollable by means of abnormal hydraulic pressure sensing means mounted in the hydraulic machine, or shear pins may be provided which would be broken when the guide vanes are blocked to enable blocking of the guide vanes to be indirectly sensed.

FIG. 11 is a control block diagram for effecting control with the embodiments of the method in confirmity with the invention shown in FIGS. 2-5. The controllers of the higher pressure stage and lower pressure stage guide vanes operate in conjunction with each other through a central controller in such a manner that the guide vanes 2 and 4 are maintained in a predetermined opening degree relation. Each control signal produced by the stage controllers effects control of the opening and closing of the respective guide vanes through a power amplifier. When guide vanes of one stage have become uncontrollable, the condition is sensed by a sensor and produces a signal transmitted to the controller of the guide vanes of the other stage to enable the controller to give instructions to the guide vanes of the other stage in accordance with a program prepared beforehand based on the signal from the sensor. As a result, the opening degree relation between the guide vanes 2 and 4 is kept on the safe side.

Figure 6:
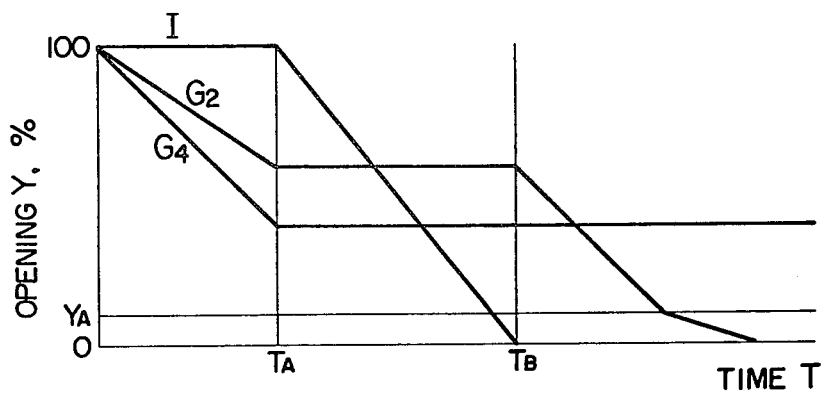

FIGS. 6–10 show embodiments of the operation control method in conformity with the invention which enables control of the inlet valve 8 to be effected simultaneously as control of the guide vanes is effected. An embodiment shown in FIG. 6 enables control of the inlet valve 8 to be effected in addition to the control of the guide vanes 2 and 4. When the guide vanes 2 and 4 start a closing operation, the inlet valve 8 is normally in full open position. In FIG. 6, if the higher pressure side guide vanes 4 are blocked at time $T_A$, the closing operation of the lower pressure stage guide vanes 2 is interrupted as aforesaid. At this time, the inlet valve 8 also starts closing. When the inlet valve 8 is brought to full closed position at time $T_B$, then the lower pressure stage guide vanes 2 are brought to full closed positions following the inlet valve 8. In hydraulic machines in practical use, when guide vanes of one stage are blocked, the inlet valve 8 and the guide vanes of the other stage are advantageously brought to full closed positions in many cases. Needless to say, no trouble occurs even if the opening degree relation between the guide vanes 2 and 4 is reversed after the inlet valve 8 is brought to full closed position.

Figure 7:
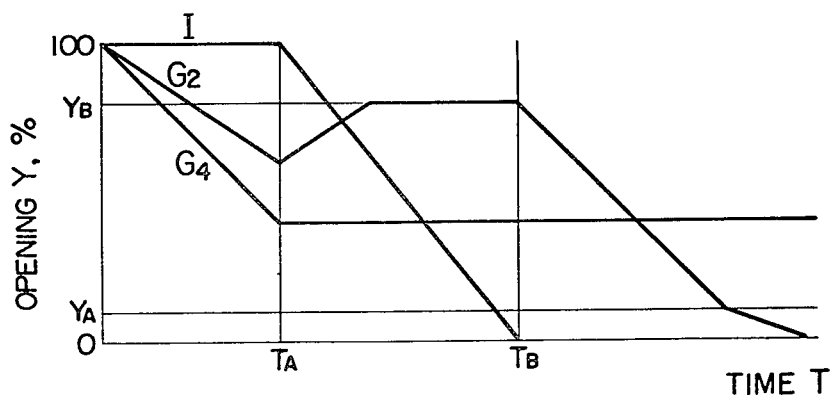

In place of interrupting the closing operation of the lower pressure stage guide vanes 2 at time $T_A$ as shown in FIG. 6, the lower pressure stage guide vanes 2 may be opened as shown in FIG. 7 to bring the opening degree relation between the guide vanes 2 and 4 to a further safer side. When this is the case, the operation of opening the lower pressure stage guide vanes 2 may be stopped when the degree of opening reaches $Y_B$ or consummated until they are brought to full open positions as shown in FIG. 3.

Figure 8:
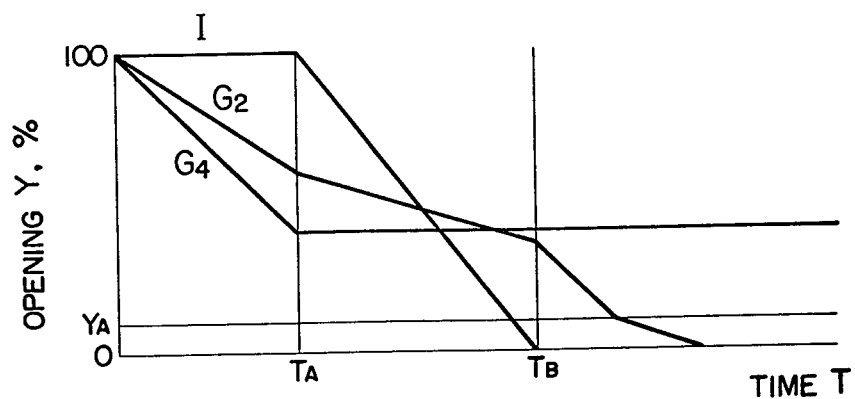

FIG. 8 shows a modification of the embodiment shown in FIG. 6. In this modification, the operation of closing the lower pressure stage guide vanes 2 is not interrupted but the speed of operation is reduced and the inlet valve 8 starts closing at the same time at time $T_A$. After the inlet valve 8 is brought to full closed position at time $T_B$, the closing operation of the lower pressure stage guide vanes 2 is accelerated until they are brought to full closed positions. Between times $T_A$ and $T_B$, the degree of openings of the higher pressure stage guide vanes 4 is constant and that of the lower pressure stage guide vanes 2 is gradually becoming lower. It will thus be evident that the opening degree relation between the guide vanes 2 and 4 is shifting toward a dangeour side. However, no serious trouble occurs so long as the opening degree relation between the guide vanes 2 and 4 is in a predetermined allowable range. The predetermined allowable range may vary depending on the type of hydraulic machines or the conditions under which the hydraulic machine is used. What is important is that the degree of opening of the lower pressure stage guide vanes 2 is equal to or higher than that of the higher pressure stage guide vanes 4. As shown in FIG. 8, no trouble may occur even if the opening degree relation is somewhat reversed.

Figure 9:
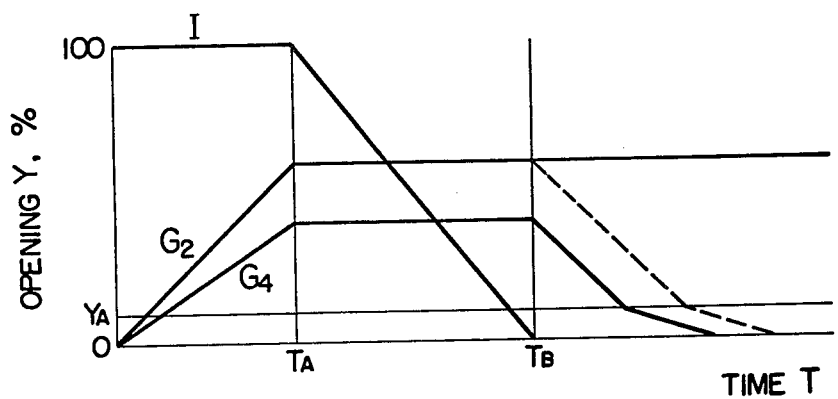
Figure 10:
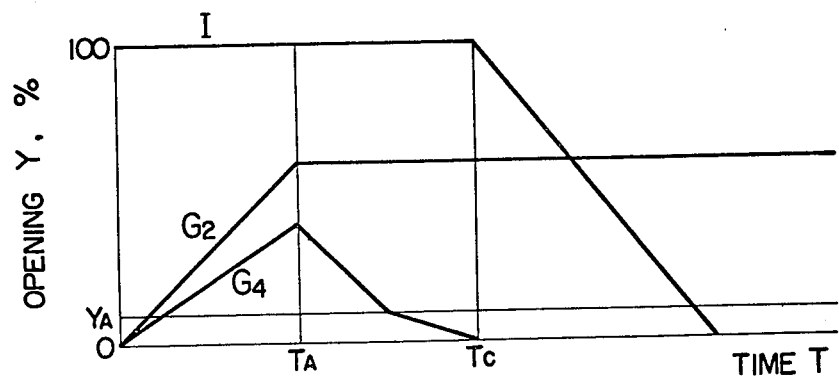

FIGS. 9 and 10 show embodiments of the method in conformity with the invention in which control of the inlet valve 8 is effected in conjunction with control of the guide vanes 2 and 4 as shown in FIGS. 4 and 5. When the guide vanes 2 and 4 start opening, it is necessary that the degree of opening of the inlet valve 8 be at a sufficiently high level. In FIGS. 9 and 10, the inlet valve 8 has a degree of opening of 100%. In FIG. 9, when the lower pressue stage guide vanes 2 are blocked at time $T_A$, the opening operation of the higher pressure stage guide vanes 4 is interrupted and the inlet valve 8 starts closing at the same time. As the inlet valve 8 is brought to full closed position at time $T_B$, the higher pressure stage guide vanes 4 start closing until they are brought to full closed positions. Even if the lower pressue stage guide vanes 2 are unable to perform an opening operation, they may be closed starting at time $T_B$ as shown in broken lines in FIG. 9, when they are capable of being closed. In place of interrupting the opening action of the higher pressure stage guide vanes 4 at time $T_A$, they may be immediately closed as shown in FIG. 10. Also, the time at which the inlet valve 8 starts its closing operation may be selected at any time as desired after time $T_A$. For example, the closing operation of the inlet valve 8 may be started at time $T_C$ at which the higher pressure stage guide vanes 4 are in full closed positions.

The foregoing description refers to the embodiments of the operation control method in conformity with the invention which are carried into practice when the guide vanes of the higher pressure stage are blocked while the higher and lower pressure stage guide vanes 2 and 4 are performing a closing operation (see FIGS. 2, 3, 6, 7 and 8) and when the guide vanes of the lower pressure stage are blocked while the guide vanes of the higher and lower pressure stages are performing an opening operation (see FIGS. 4, 5, 8 and 10). Other conditions of the guide vanes will be described. For example, if the lower pressure stage guide vanes are blocked when the guide vanes 2 and 4 are performing a closing operation, then the higher pressure stage guide vanes continue the closing operation while the lower pressure stage guide vanes have their closing operation interrupted. At this time, the degrees of opening of the lower pressue stage guide vanes 2 are higher than those of the higher pressure stage guide vanes 4 at all times. This condition has no need to carry the operation control method according to the invention into practice because no fluid hammer of high magnitude acts on the lower pressure side of the hydraulic machine. If the higher pressure stage guide vanes 4 are blocked when the higher and lower pressure stage guide vanes are both performing an opening operation, there is no need to carry the operation control method according to the invention into practice because the opening degree relation between the higher and lower pressure stage guide vanes is on the safe side.

In the embodiments shown in FIGS. 2–10, the opening and closing operations are consummated until the degrees of opening 100% and 0% are reached respectively. The method according to the invention can have application to cases where the guide vanes are opened or closed when they have a degree of opening intermediate between 100% and 0%. The description of the embodiments set forth hereinabove refers to an application of the method to a two-stage regulated hydraulic machine. It will be understood that the invention is not limited to this specific type of hydraulic machine and that it can have application to any multistage regulated hydraulic machine including at least two stages from the lowest pressure side to the highest pressure side having channels communicated with each other through return passages and provided with guide vanes which can be controlled.

From the foregoing description, it will be appreciated that the embodiments of the operation control method in conformity with the invention shown and described hereinabove are capable, when guide vanes of one stage are blocked, of being carried into practice by a simple process of giving opening or closing instructions to the guide vanes of the other stage and the inlet valve. Thus operation control can be quickly and readily effected, and controllers for effecting control can be additionally attached to an existing hydraulic machine at low expenses. The normal operation of the hydraulic machine is not interfered with in any way by the working of the operation control method according to the invention, and the invention is capable of protecting a hydraulic machine from fluid hammer when some guide vanes are blocked.

What is claimed is:

1. An operation control method for a multistage regulated hydraulic machine wherein channels of the stages from the lower pressure side to the higher pressure side are successively communicated with each other through return guides and at least two said stages are provided with respective guide vanes capable of having their degrees of opening controlled in synchronism with each other, such method comprising the steps of:
- (a) sensing that guide vanes of one of the stages becomes uncontrollable when the operation of opening and closing the guide vanes capable of having their degrees of opening controlled is performed while the degrees of opening of the guide vanes capable of having the degrees of opening thereof controlled are maintained in a predetermined opening degree relation; and
- (b) effecting control of the degrees of opening of the guide vanes of the other stages based on a signal issued in accordance with the result of sensing so as to keep the degree of opening of the guide vanes that have become uncontrollable and the degrees of opening of the guide vanes of the other stages in a predetermined relation of allowable opening degrees.

2. An operation control method as claimed in claim 1, wherein when a closing operation is performed for said guide vanes capable of having their degrees of opening controlled, control of the degrees of opening of the guide vanes of the stages of lower pressure than the guide vanes that have become uncontrollable is effected based on said signal issued in accordance with the result of sensing.

3. An operation control method as claimed in claim 2, wherein the degrees of opening of the guide vanes of the lower pressure stages are kept at the same degrees of opening as at the time at which said signal is issued.

4. An operation control method as claimed in claim 2, wherein the degrees of opening of the guide vanes of the lower pressure stages are controlled in such a manner that they are increased above the degrees of opening obtained when said signal is issued in accordance with the result of sensing.

5. An operation control method as claimed in claim 1, wherein when an opening operation is performed for said guide vanes capable of having their degrees of opening controlled, control of the degrees of opening of the guide vanes of the stages of higher pressure than the guide vanes that have become uncontrollable is effected based on said signal issued in accordance with the result of sensing.

6. An operation control method as claimed in claim 5, wherein the degrees of opening of the guide vanes of the higher pressure stages are kept at the same degrees of opening as at the time at which the signal is issued.

7. An operation control method as claimed in claim 5, wherein the degrees of opening of the guide vanes of higher pressure stages are controlled in such a manner that they are reduced below the degrees of opening obtained when said signal is issued in accordance with the result of sensing.

8. An operation control method as claimed in claim 1, further comprising the step of closing an inlet valve based on said signal issued in accordance with the result of sensing.

9. An operation control method as claimed in claim 8, wherein when a closing operation is performed for said guide vanes capable of having their degrees of opening controlled, control of the degrees of opening of the guide vanes of the stages of lower pressure than the guide vanes that have become uncontrollable is effected based on said signal issued in accordance with the result of sensing.

10. An operation control method as claimed in claim 9, wherein the degrees of opening of the guide vanes of the lower pressure stages are kept at the same degrees of opening as at the time at which said signal is issued, and the guide vanes of the lower pressure stages are closed after the inlet valve is brought to full closed position.

11. An operation control method as claimed in claim 9, wherein the degrees of opening of the guide vanes of the lower pressure stages are controlled in such a manner that, although they are reduced below the degrees of opening obtained when said signal is issued, the speed of the closing operation is reduced below the speed prevailing before the signal is issued and the degrees of opening of the guide vanes of the lower pressure stages and the degree of opening of the guide vanes that have become uncontrollable satisfy a predetermined allowable opening degree relation, and wherein the guide vanes of the lower pressure stage are closed after the inlet valve is brought to full closed position.

12. An operation control method as claimed in claim 9, wherein the degrees of opening of the guide vanes of the lower pressure stages are controlled in such a manner that they are increased above the degrees of opening obtained when said signal is issued in accordance with the result of sensing and thereafter kept at certain degrees of opening, and wherein the guide vanes of the lower pressure stages are closed after the inlet valve is brought to full closed position.

13. An operation control method as claimed in claim 8, wherein when an opening operation is performed for the guide vanes capable of having their degrees of opening controlled, control of the degrees of opening of the guide vanes of the stages of higher pressure than the guide vanes that have become uncontrollable is effected based on said signal issued in accordance with the result of sensing.

14. An operation control method as claimed in claim 13, wherein the degrees of opening of the guide vanes of the higher pressure stages are controlled in such a manner that they are kept at the same degrees of opening as at the time at which said signal is issued and that the guide vanes of the higher pressure stages are closed after the inlet valve is brought to full closed position.

15. An operation control method as claimed in claim 13, wherein the degrees of opening of the guide vanes of the higher pressure stages are controlled in such a manner that they are reduced below the degrees of opening prevailing when said signal is issued and that the inlet valve is closed after the guide vanes of the higher pressure stages are brought to full closed positions.

* * * * *